United States Patent [19]

Traylor

[11] Patent Number: 4,828,449
[45] Date of Patent: May 9, 1989

[54] TRAILER WITH LIFT TRUCK STORAGE COMPARTMENT

[76] Inventor: Billy J. Traylor, 160 Dilbeck Rd., P.O. Box 1047, Rainsville, Ala. 35986

[21] Appl. No.: 91,945

[22] Filed: Sep. 1, 1987

[51] Int. Cl.⁴ .................................................. B60P 3/06
[52] U.S. Cl. .................................. 414/462; 280/423.1; 414/467; 414/537
[58] Field of Search ............... 414/462, 537, 538, 467; 296/37.1, 37.6; 280/423 R; 410/4

[56] References Cited

U.S. PATENT DOCUMENTS

| | | | |
|---|---|---|---|
| 2,466,938 | 4/1949 | Evans et al. | 280/423 R X |
| 2,995,399 | 8/1961 | Riseborough | 414/537 X |
| 3,399,794 | 9/1968 | Hummel | 280/423 R X |
| 3,561,621 | 2/1971 | Rivers | 414/462 X |
| 3,741,604 | 6/1973 | Heath | 414/538 X |
| 3,834,565 | 9/1974 | Goodman et al. | 414/537 |
| 4,435,113 | 3/1984 | Mosely et al. | 414/537 X |

FOREIGN PATENT DOCUMENTS 2359418  6/1975  Fed. Rep. of Germany ...... 414/467

Primary Examiner—Leslie J. Paperner
Attorney, Agent, or Firm—Fleit, Jacobson, Cohn & Price

[57] ABSTRACT

A trailer having a storage compartment for a lift truck or other device that can be utilized to load material onto the trailer or unload material from the trailer. A loading and unloading ramp for the lift truck is attached to the trailer for pivotal movement from an outwardly and downwardly inclined position where the free end rests on the ground surface to a generally vertically disposed stored or over-the-road position. A winch mechanism is mounted on the trailer and includes a lift cable connected with the outer end of the ramp for raising and lowering the ramp. The lift truck compartment is a recess adjacent the forward end of the trailer which extends transversely of the load carrying surface and includes a supporting surface offset downwardly from the load carrying surface of the trailer. The lift truck compartment being near the front of the trailer provides better weight distribution with a substantial portion of the weight being placed on the pulling axle and wheels of the tractor which more evenly distributes the weight on the axles of the tractor and trailer and also provides the lift truck with a better ride and protection from road dirt and other abuse as well as enabling the lift truck to be quickly and easily loaded and unloaded. The compartment includes a stop or barrier along the longitudinal edge portion thereof opposite to the ramp to prevent the lift truck from being driven off the opposite side of the trailer.

2 Claims, 2 Drawing Sheets

TRAILER WITH LIFT TRUCK STORAGE COMPARTMENT

BACKGROUND OF THE INVENTION

Field of the Invention

The present invention generally relates to a trailer having a storage compartment for a lift truck or other device that can be utilized to load material onto the trailer or unload material from the trailer. A loading and unloading ramp for the lift truck is attached to the trailer for pivotal movement from an outwardly and downwardly inclined position where the free end rests on the ground surface to a generally vertically disposed stored or over-the-road position. A winch mechanism is mounted on the trailer and includes a lift cable connected with the outer end of the ramp for raising and lowering the ramp. The trailer is provided with a recess adjacent the forward end thereof with the recess extending transversely of the load carrying surface to form a generally transverse lift truck receiving and supporting surface offset downwardly from the load carrying surface of the trailer. The arrangement of the lift truck compartment near the front of the trailer provides better weight distribution with a substantial portion of the weight being placed on the pulling axle and wheels of the tractor which more evenly distributes the weight on the axles of the tractor and trailer and also provides the lift truck with a better ride and protection from road dirt and other abuse. In addition, this arrangement enables the lift truck to be quickly and easily loaded into the compartment and unloaded from the compartment with the compartment including a stop or limit arrangement along the longitudinal edge portion thereof opposite to the ramp so that it will prevent the lift truck from being driven off the opposite side of the trailer and cooperates with the ramp when in vertical position and a chain and load binder to effectively retain the lift truck in position on the trailer.

INFORMATION DISCLOSURE STATEMENT

One of the problems which has existed in transporting various materials is the delay and labor required to load a payload onto a transporting vehicle and unload the payload from the vehicle at a destination. Various types of lift trucks and similar arrangements have been used for this purpose, especially when the transporting vehicle is a truck, tractor trailer arrangement and the like. While a fork lift truck provides substantial assistance, it is necessary that fork lift trucks be available at the loading site as well as at the unloading site. In order to assure that a fork lift truck is always available, it has been feasible in some instances to load a fork lift truck onto the truck or trailer and carry it along with the load to an unloading site at which point the fork lift truck can be first unloaded and then used to unload the payload. Prior efforts of this type include an arrangement in which the fork lift is mounted on the rear of a load carrying trailer and forms an extension thereof. While this alleviates the problem of having a lift truck available, it increases the overall length of the tractor trailer and also increases the weight supported by the rear wheels on the trailer since the weight of the lift truck is cantilevered behind the rearmost trailer axles, which also results in an upward force being imparted to the forward end of the trailer and the king pin which results in a reduced weight on the driving wheels of the tractor. This arrangement also subjects the fork lift truck to road dirt and other adverse environmental conditions and the rearward projection of the fork lift truck in relation to the trailer increases the possibility of the fork lift truck being damaged when maneuvering the trailer over the road or adjacent a loading dock and the like. None of the prior art provides a fork lift compartment and loading ramp similar to the present invention. A separate information disclosure statement will be filed.

SUMMARY OF THE INVENTION

An object of the present invention is to provide a trailer having a generally horizontally disposed load receiving and supporting surface having an upwardly offset forward end portion provided with a king pin for articulate connection to a tractor vehicle and rear supporting wheels and axles which may be in the form of a tandem axle assembly or the like with a fork lift truck compartment being incorporated into the load bed of the trailer adjacent the forward end thereof so that the major portion of the weight of the fork lift truck will be supported by the driving wheels of the tractor unit.

Another object of the invention is to provide a trailer in accordance with the preceding object in which the fork lift truck compartment is recessed downwardly from the load receiving and supporting surface to lower the center of gravity of the fork lift truck and to reduce the elevation of the fork lift supporting surface above ground surface.

A further object of the invention is to provide a flat bed trailer in accordance with the preceding objects in which the fork lift truck compartment is provided with a pivotal ramp at one edge thereof with the lowered elevation of the fork lift truck supporting surface enabling the pivotal ramp to be inclined at an angle to enable the fork lift truck to be driven up and down the ramp when loading and unloading the fork lift truck.

Still another object of the invention is to provide a flat bed trailer with a storage compartment for a fork lift truck in accordance with the preceding objects in which the compartment extends transversely of the trailer and is provided with a stop arrangement at one edge thereof opposite to the ramp with the ramp being raised and lowered by a winch mechanism and limited to positioning in a vertical position when elevated so that the fork lift truck will be protected from road dirt and the like and retained in the compartment.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
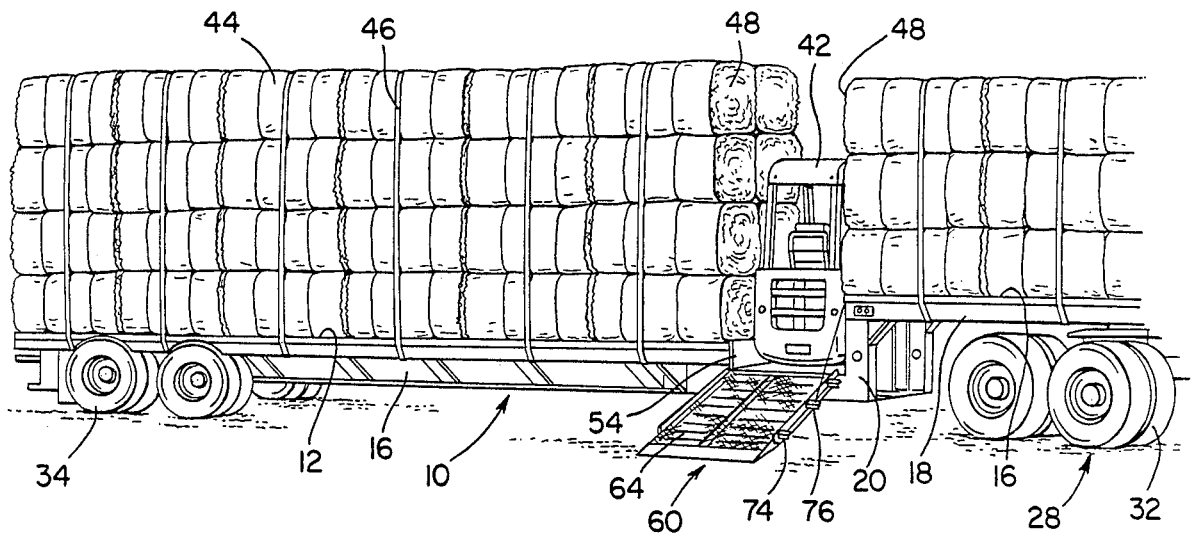
FIG. 1 is a perspective view of a loaded trailer with a portion of the tractor unit being illustrated including the driving and supporting wheels with the ramp in operative position by which the fork truck can be loaded onto or unloaded from the trailer.

Referring to the drawings, the trailer of the present invention is generally designated by reference numeral 10 with the trailer including a generally horizontally disposed load carrying deck or surface 12 extending from the rear of the trailer forwardly to an upwardly offset forward deck or load carrying surface 14 with suitable supporting framework 16 being provided for the load supporting surface 12 and suitable framework 18 being provided for the load supporting surface 14. An upwardly offset framework 20 interconnects the load surfaces 12 and 14 with the forward end of the trailer including the usual king pin 22 and plate 24 for connection with the fifth wheel assembly 26 on the tractor unit 28. The fifth wheel assembly 26 is mounted on the rear frame 30 of the tractor unit over the supporting and driving wheel assemblies 32 which may be in the form of a tandem drive wheel arrangement. The tractor unit 28 is conventional.

Figure 2:
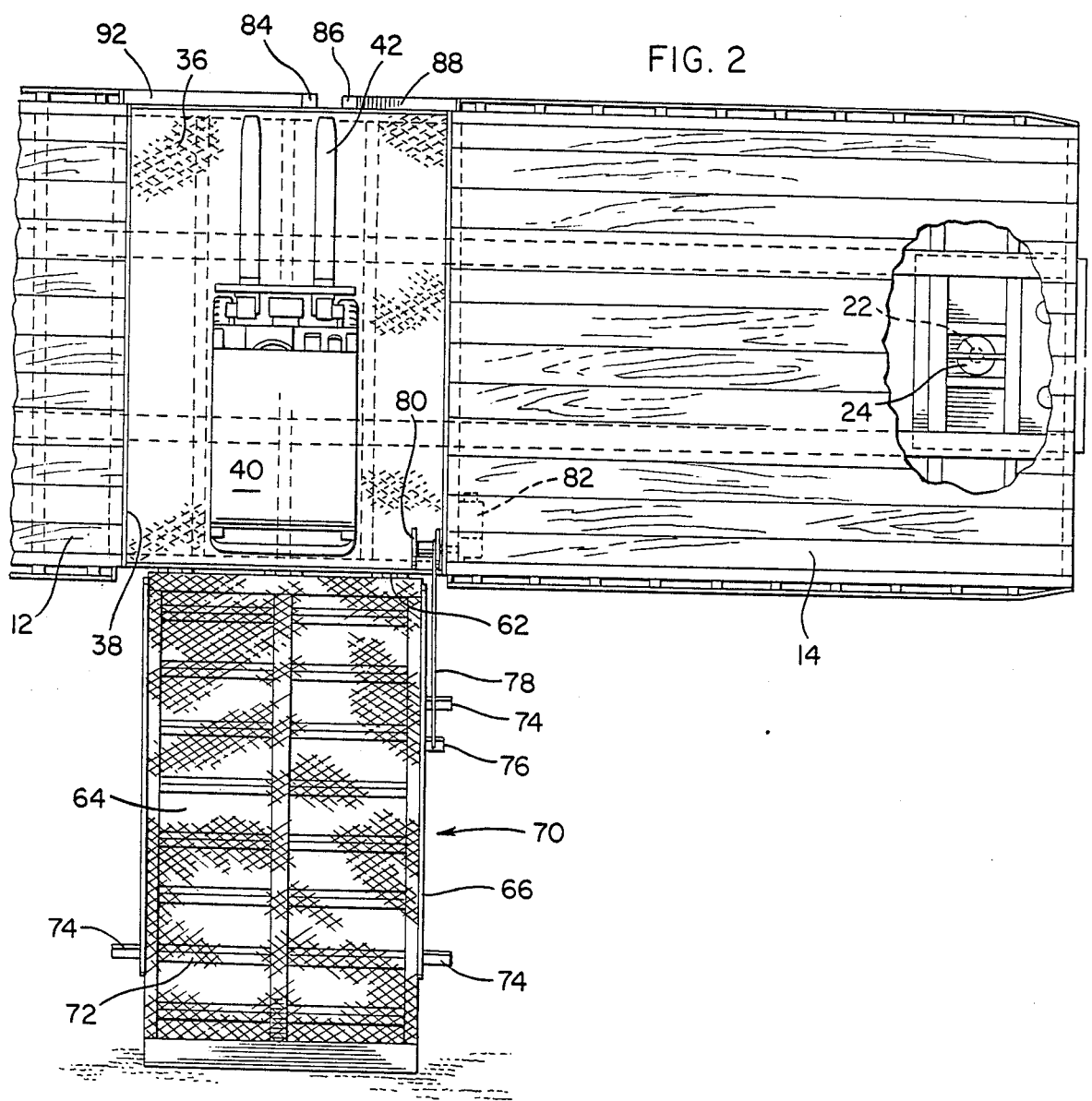
FIG. 2 is a plan view of the construction of FIG. 1.
Figure 4:
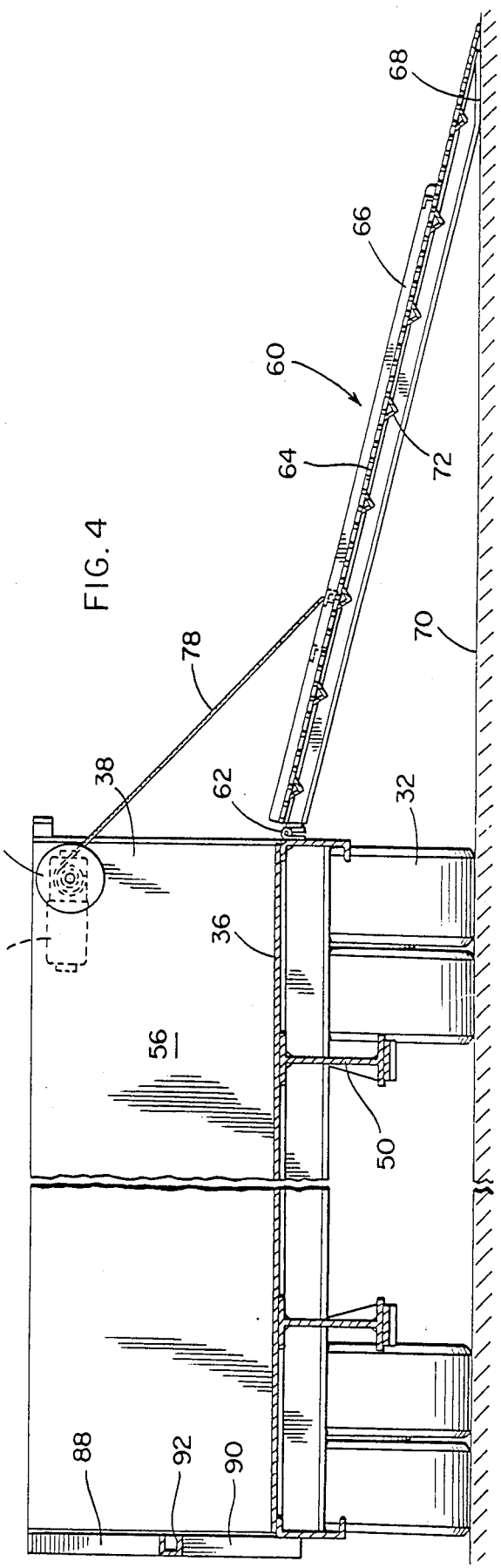
FIG. 4 is a transverse sectional view taken substantially upon a plane passing along section line 4—4 on FIG. 3 illustrating structural details of the fork lift storage compartment and ramp.

The rear portion of the trailer 10 is supported by wheel and axle assemblies 34 which may also be tandem axle and wheel assemblies. The frame structure, the reinforcements provided therefor and the strength characteristics provided therein are conventional in and of themselves and form no particular part of the invention except that the forward end of the rearward load carrying surface where it joins with the forward load carrying surface 14 is downwardly offset as at surface 36 to form a compartment 38 in the form of a transverse recess in the load carrying surface 12 for receiving a fork lift truck 40 with the length of the compartment 38 being sufficient to receive the fork lift truck 40 therein with the fork tines 42 also being received within the transverse dimensions of the compartment 38 which extends completely across the trailer 10 as illustrated in FIGS. 2 and 4. As illustrated in FIG. 1, the load carrying surface 12 and the load carrying surface 14 are provided with a payload such as bales 44 of paper or other material with it being pointed out that various types of payloads may be loaded onto the load carrying surfaces 12 and 14 and retained in position thereon by load binders, straps or the like 46. The area above the compartment 38 is void of the payload so that the spaced ends 48 of the load bales which are in alignment with the front and rear ends of the compartment 38, in effect, form a vertical extension of the compartment 38 and protect the fork lift truck from road dirt and the like.

As illustrated in FIG. 4, the compartment 38 is defined by the load support surface 36 or deck which is supported by longitudinal frame members 50 supported from the offset structure 20 at the forward end and by bracket and brace structure 52 at the rearward end so that the structural integrity of the flat bed trailer will be continuous from end-to-end with the structure of the recessed deck 36 and supporting frame structure being similar to that used in a drop center trailer. The rearward end of the compartment 38 includes a vertical plate 54 and the forward end of the compartment 38 includes a forward plate 56 which precludes the lift truck 40 from coming into contact with the ends 48 of the load bales 44 or other payload on the load supporting surfaces 12 and 14. All of these components are rigidly interconnected and fixed together by bolting, welding or the like having requisite strength characteristics corresponding to the expected load conditions to be encountered.

Figure 3:
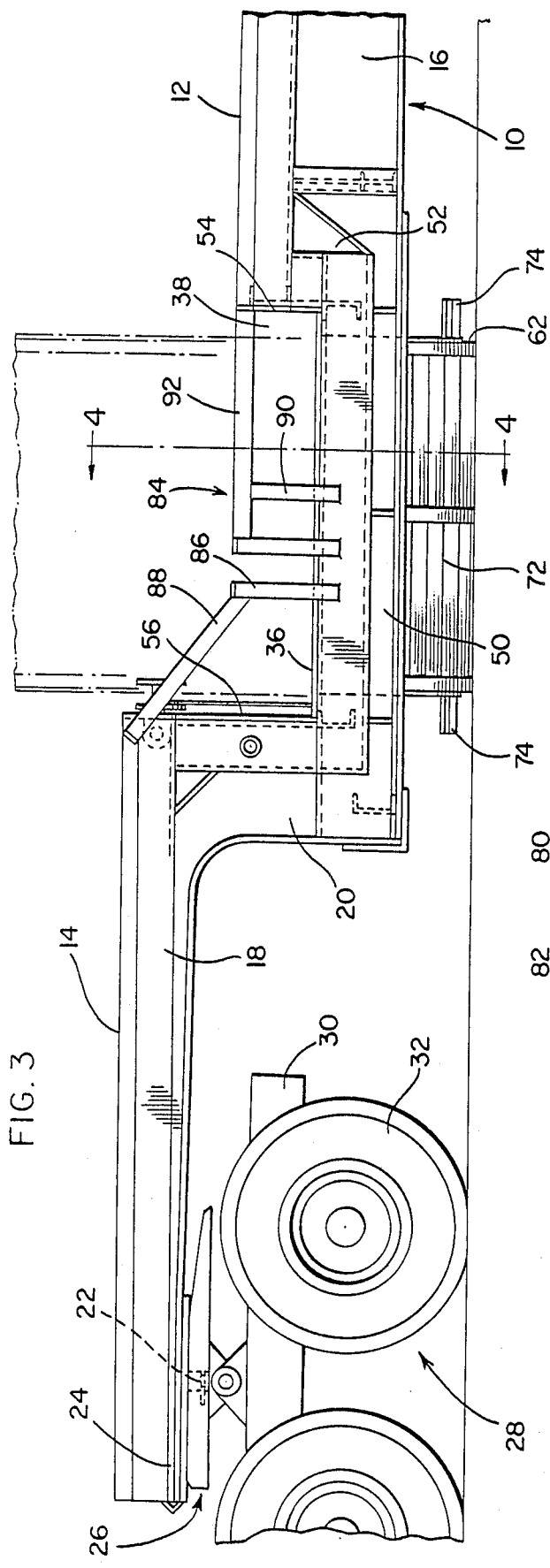
FIG. 3 is a side elevational view of the construction of FIG. 1.

An elongated ramp generally designated by numeral 60 is pivotally connected to the outermost frame rails of the compartment 38 by a pivot or hinge assembly 62. The ramp 60 includes a plate or deck 64 with edge rails 66 which are inclined at 68 at their outer end so that the inclined end edges will engage flush with a ground surface 70 extending laterally from the trailer 10 as illustrated in FIG. 4. The arrangement in which the deck 36 is dropped downwardly in relation to the load supporting surface 12 enables the ramp 60 to be inclined at a less angle than if the supporting surface 36 was in horizontal alignment with the load supporting surface 12. This enables the fork lift truck to be easily driven onto and off of the load supporting surface 36 in either forward or reverse direction without dragging over the juncture between the ramp 60 and the load supporting surface 36 as might occur in view of the low ground clearance on fork lift trucks. Also, the reduction in the angle of inclination reduces the problem of traction when the fork lift truck is being driven onto or off of the trailer. The ramp includes transverse reinforcement members of V-shaped cross-sectional configuration as indicated by the numeral 72 and the ramp plate 64 is constructed of steel tread or decking whereas the remainder of the trailer may include wood supporting surfaces 12 and 14. The side rails 66 of the ramp plate 64 include laterally extending lugs 74 thereon to limit the upward pivotal movement of the ramp 60 to substantially a vertical position when in stored or over-the-road condition. Also, a lateral lug 76 is provided to which is connected a lift cable 78 extending over the winch drum 80 of a winch mechanism 82 oriented at the upper end portion of the front wall 56 of the compartment 38. The winch 82 may be electrically driven by the electrical system of the vehicle or a manually operated winch mechanism may be provided in order to raise and lower the ramp between the full line operative position illustrated in the drawings and the stored or vertical position as illustrated in broken lines in FIG. 3.

The side of the compartment 38 opposite that to which the ramp 60 is pivoted is provided with a stop or barrier generally designated by reference numeral 84 which includes spaced vertical uprights 86 with one endmost upright being rigidly connected to an inclined brace member 88 which extends from the upper end of the member 86 to the front frame structure 18. The two rearmost uprights 90 are interconnected by a horizontal brace 92 which are rigidly connected thereto. The brace 92 is in alignment with and rigidly connected to the forward end of the rear load supporting surface 12.

By orienting the lift truck compartment at the juncture between the rear load supporting surface 12 and the forward load supporting surface 14 as conventionally provided in this type of trailer, the major portion of the weight of the lift truck is placed on the pulling axle and driving wheels 32 to increase the traction and for better weight distribution. Also, the lift truck gets a better ride in this position as compared to being a rearward extension of the trailer and is protected from road dirt, damage and other abuse. The lift truck can be loaded and unloaded quickly and easily with the mechanically raised and lowered ramp and does not alter the manner of loading the truck other than to the extent of omitting that portion of the load that would be normally provided on the portion of the load supporting surface that is occupied by the compartment 38. In fact, when bales 44 of paper or other material are used, only a single transverse row of bales need be omitted from the load to accommodate the fork lift truck.

While the lift truck storage compartment is shown in a flat bed trailer, it also can be incorporated into other types of trailers, such as van trailers, as well as other over-the-road type load carrying vehicles. Also, the lift truck may be oriented in the compartment with the tines or forks oriented toward the ramp and folded upwardly adjacent the vertically movable carrier. In instances where the lift tines do not fold and the lift truck has an overall length greater than the width of the trailer, the lift tines or forks may be detached from the carrier and stored with the tines extending under the lift truck. A chain or cable and load binder is used to securely retain the lift truck stationarily in the compartment during over-the-road movement in order to prevent the lift truck from shifting. In order to provide the lift cable with a better lifting angle on the ramp, a vertical post or frame member may be provided on load surface 14 adjacent compartment 38 with a pulley journalled at the upper end thereof. The lifting cable 78 would be extrained over the pulley to provide a larger vertical lifting vector for the tension in the lifting cable.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trailer comprising a generally horizontally disposed load supporting surface provided with supporting wheels adjacent the rear thereof and an articulate connection with a towing vehicle at the forward end thereof, and a transverse recess in the load supporting surface oriented in the forward portion of the trailer adjacent the towing vehicle for supportingly receiving a fork lift truck whereby a major portion of the weight of the fork lift truck will be transferred to the towing vehicle through the articulate connection at the forward end of the trailer, a loading ramp, means pivotally mounting one end of the loading ramp to an edge portion of the recess in the load supporting surface with the ramp extending laterally from the trailer with the outer end of the ramp resting on ground surface to enable a fork lift truck to be driven along the ramp when loading or unloading the fork lift truck, said ramp being pivoted to a generally vertical position to retain the lift truck in the recess, a winch mounted on the trailer above the point of connection with the ramp and having a lift cable attached to the ramp for raising and lowering the ramp from an operative outwardly and downwardly inclined position to an upwardly extending, generally vertical stored position, a stop assembly at the edge of the recess opposite the edge of the recess having the ramp connected thereto, said stop assembly including a plurality of rigid structural members fixedly attached to the trailer and forming a barrier to prevent the fork lift truck from proceeding too far into the recess when positioned therein, said load supporting surface of the trailer including an upwardly offset forward portion having the means connecting the trailer to a towing vehicle mounted thereon with the recess being in the form of a transverse compartment at the rearward end of the upwardly offset forward portion of the load supporting surface.

2. An over-the-road tractor and trailer interconnected by an articulate connection with the tractor including rear drive wheels adjacent the articulate connection and the trailer including support wheels adjacent the rearward end thereof, said trailer including an elongated rearward load supporting surface having a generally flat, horizontal upper surface, said trailer also including a forward load supporting surface having a generally flat, horizontal upper surface overlying the articulate connection and tractor drive wheels, said forward load supporting surface being disposed in a horizontal plane upwardly offset in relation to the rearward load supporting surface, an intermediate load supporting surface between the upwardly offset forward load supporting surface and the rearward load supporting surface with the intermediate load supporting surface extending transversely of the trailer and being relatively longitudinally short as compared to the forward and rearward load supporting surfaces and being located adjacent the articulate connection and the rear driving wheels of the tractor and including a generally horizontal planar surface spaced below both the forward and rearward load supporting surfaces and at a greater distance below the upwardly offset forward load supporting surface as compared to its distance below the rearward load supporting surface, said intermediate load supporting surface being defined by substantially vertical, planar end plates with the forward end plate extending between and connected to the rearward end edge of the upwardly offset forward load supporting surface and the forward edge of the intermediate load supporting surface, the rearward end plate extending between and connected to the forward end edge of the rearward load supporting surface and the rearward edge of the intermediate load supporting surface whereby the trailer load supporting surfaces provide vertical access to the intermediate load supporting surface throughout the forward to rearward length of the intermediate load supporting surface, means at one side edge of the intermediate load supporting surface to limit movement of a lift truck onto the load supporting surface, a ramp pivotally mounted at the other side edge of the intermediate load supporting surface to enable a lift truck to be driven onto and off of the intermediate load supporting surface and winch means elevating the ramp to a generally vertical position to form a closure for the side edge portion of the intermediate load supporting surface to retain a lift truck on the intermediate load supporting surface.

* * * * *